(12) United States Patent
Darcy

(10) Patent No.: US 9,257,846 B2
(45) Date of Patent: Feb. 9, 2016

(54) ENERGY STORAGE SYSTEMS AND ASSOCIATED METHODS

(75) Inventor: Dennis M. Darcy, Tyngsboro, MA (US)

(73) Assignee: VIONX ENERGY CORPORATION, North Reading, MA (US)

( * ) Notice: Subject to any disclaimer, the term of this patent is extended or adjusted under 35 U.S.C. 154(b) by 574 days.

(21) Appl. No.: 13/399,564

(22) Filed: Feb. 17, 2012

(65) Prior Publication Data

US 2012/0146585 A1 Jun. 14, 2012

Related U.S. Application Data

(63) Continuation of application No. PCT/US2010/045748, filed on Aug. 17, 2010.

(60) Provisional application No. 61/234,616, filed on Aug. 17, 2009.

(51) Int. Cl.
*H02J 7/00* (2006.01)
*H02J 3/28* (2006.01)
*H02J 3/32* (2006.01)
*H02J 3/00* (2006.01)

(52) U.S. Cl.
CPC ... *H02J 3/28* (2013.01); *H02J 3/32* (2013.01); *H02J 3/008* (2013.01); *Y04S 50/10* (2013.01)

(58) Field of Classification Search
CPC ........................................................ H02J 3/28
USPC ........... 320/124, 125, 128; 307/64–67, 85, 86
See application file for complete search history.

(56) References Cited

U.S. PATENT DOCUMENTS

| 5,541,489 A | 7/1996 | Dunstan |
| 8,513,829 B1 * | 8/2013 | Wells et al. ................ 307/9.1 |
| 8,791,589 B2 * | 7/2014 | Colello ................ G06Q 50/06 307/150 |

(Continued)

FOREIGN PATENT DOCUMENTS

| JP | 2000224769 | 8/2000 |
| JP | 2001025169 | 1/2001 |

(Continued)

OTHER PUBLICATIONS

International Search Report and Written Opinion in related PCT Patent Application PCT/US2010/045748, issued Mar. 24, 2011, 9 pages.

(Continued)

*Primary Examiner* — Richard V Muralidar
(74) *Attorney, Agent, or Firm* — Lathrop & Gage LLP

(57) ABSTRACT

A method for responding to a change in electric power demand includes (1) charging an energy storage subsystem from an electric power grid, (2) discharging the energy storage subsystem into the electric power grid at a discharge rate that is less than a maximum rate of discharge of the energy storage subsystem, and (3) adjusting the discharge rate in response to a signal selected from the group consisting of a signal to provide a regulation up service and a signal to provide a regulation down service. An energy storage system includes an energy storage subsystem for storing electric power, an interface for interfacing the energy storage subsystem with an electric power grid, and a controller configured to control operation of the interface in response to a signal to provide a regulation up service and a signal to provide a regulation down service.

8 Claims, 2 Drawing Sheets

(56) References Cited

U.S. PATENT DOCUMENTS

| | | | |
|---|---|---|---|
| 2004/0263116 A1* | 12/2004 | Doruk et al. | ........... 320/107 |
| 2008/0040263 A1 | 2/2008 | Pollack et al. | |
| 2008/0114499 A1 | 5/2008 | Hakim et al. | |
| 2008/0281663 A1 | 11/2008 | Hakim et al. | |

FOREIGN PATENT DOCUMENTS

| | | |
|---|---|---|
| JP | 2001037085 | 9/2001 |
| JP | 2003259696 | 9/2003 |
| JP | 2003284244 | 10/2003 |

OTHER PUBLICATIONS

Response to Written Opinion in related PCT Patent Application PCT/US2010/045748, filed Jun. 23, 2011, 19 pages.

Japanese Patent Application No. 2012-525640, translation of Official Action mailed Jun. 10, 2014, 4 pages.

Japanese Patent Application No. 2012-525640, translation of Official Action mailed Jan. 15, 2015, 6 pages.

* cited by examiner

ENERGY STORAGE SYSTEMS AND ASSOCIATED METHODS

CROSS-REFERENCE TO RELATED APPLICATIONS

This application is a continuation of PCT Patent Application Serial No. PCT/US2010/045748, filed Aug. 17, 2010 which claims benefit of priority to U.S. Provisional Patent Application No. 61/234,616 filed Aug. 17, 2009, both applications are incorporated herein by reference.

BACKGROUND

An electric utility typically provides electric power to a large group of customers located in its service area. The electric power demand caused by the customers typically varies widely. Some of these variations in electric power demand are predictable. For example, electric power demand during the summer may be expected to peak on weekdays during late afternoon or early evening as residential customers return home and switch on their air conditioning systems. Other load demands, however, may not be predictable. For example, a utility may experience a sudden drop in electric power demand due to tripping of a circuit breaker controlling a major feeder circuit.

Electric power demand variations are problematic to electric utilities. For example, it may be impossible for an electric utility's electric generation equipment (e.g., a coal fired power plant) to respond quickly to a change in demand for electricity, resulting in undesired voltage and/or frequency fluctuations. As another example, an electric utility may not have adequate generation capacity to meet a peak electric power demand, and the utility may therefore be forced to purchase electric power at a high price from another party to cover the shortfall.

Accordingly, energy storage systems have been proposed to compensate for changes in electric power demand. Such systems may provide electric power to an utility's electric power grid ("regulation up") when additional electric power is needed, such as during times of peak electric power demand. As another example, such systems may absorb or store electric power from the utility's electric power grid ("regulation down") when required or when desired, such as when electric power demand suddenly drops.

SUMMARY

In an embodiment, a method for responding to a change in electric power demand includes (1) charging an energy storage subsystem from an electric power grid, (2) discharging the energy storage subsystem into the electric power grid at a discharge rate that is less than a maximum rate of discharge of the energy storage subsystem, and (3) adjusting the discharge rate in response to a signal selected from the group consisting of a signal to provide a regulation up service and a signal to provide a regulation down service.

In an embodiment, an energy storage system includes an energy storage subsystem for storing electric power, an interface for interfacing the energy storage subsystem with an electric power grid, and a controller. The controller is configured to control operation of the interface such that a discharge rate of the energy storage subsystem is adjusted in response to a signal selected from the group consisting of signal to provide a regulation up service and a signal to provide a regulation down service.

DETAILED DESCRIPTION OF EMBODIMENTS

Figure 1:
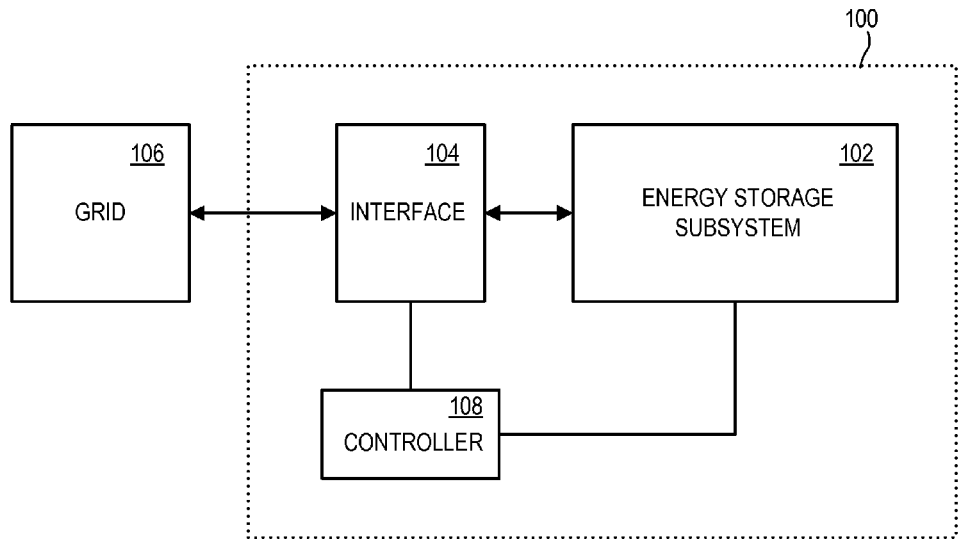
FIG. 1 shows one exemplary energy storage system, according to an embodiment.

It is noted that, for purposes of illustrative clarity, certain elements in the drawings may not be drawn to scale. Specific instances of an item may be referred to by use of a numeral in parentheses (e.g., energy storage subsystem 202(1)) while numerals without parentheses refer to any such item (e.g., energy storage subsystems 202).

As discussed above, energy storage systems have been proposed to compensate for changes in electric power demand, such as a power demand presented to an electric utility, by providing regulation up or regulation down services. Although such systems could be highly useful, their practical implementation may be difficult. For example, many energy storage technologies are expensive to implement, and therefore are not practical for large scale storage of electric power. As another example, some energy storage technologies may not be capable of responding to a change in electric power demand sufficiently quickly.

FIG. 1 shows one exemplary energy storage system 100, which may be used to help compensate for changes in electric power demand, such as electric power demand changes upon an electric utility. Accordingly, one possible use of system 100 is to provide regulation up or regulation down services, such as to an electric utility. System 100 includes an energy storage subsystem 102, an interface 104 for interfacing energy storage subsystem 102 with an electric power grid 106, and a controller 108 operable to control interface 104 and optionally operable to control energy storage subsystem 102.

Controller 108 causes energy storage subsystem 102 to be at least partially charged from grid 106 via interface 104 in preparation for system 100 providing regulation up or regulation down services. Once energy storage subsystem 102 is at least partially charged, controller 108 causes system 100 to be ready to provide regulation up and/or regulation down services by causing energy storage subsystem 102 to be discharged into grid 106 via interface 104 at a rate that is less than a maximum discharge rate of energy storage subsystem 102. For example, controller 108 may operate system 100 such that energy storage subsystem 102 is discharged into grid 106 at a rate that is about one half of energy storage subsystem 102's maximum discharge rate. In response to a signal to provide regulation up or regulation down services, controller 108 adjusts the discharge rate of energy storage subsystem 102 to help meet power demand on grid 106. In particular, if electricity demand on grid 106 decreases, controller 108 decreases the rate at which energy storage subsystem is discharged into grid 106, thereby effectively reducing electric power supplied to grid 106. Conversely, if electricity demand on grid 106 increases, controller 108 causes energy storage subsystem 102 to be discharged into grid 106 at a greater rate, thereby providing additional electric power to grid 106 to meet the additional demand. In particular, system 100 operates to rapidly adjust to electricity demand on grid 106, whereas other electrical storage systems are unable to respond quickly to demand variation.

System 100 may advantageously permit the use of an energy storage subsystem 102 that is not well suited for quickly absorbing power. In particular, because system 100 is operated such that energy storage subsystem 102 is being discharged while system 100 is providing regulation up or regulation down services, energy storage subsystem 102 need not necessarily be capable of quickly absorbing electric power. Accordingly, system 100 may enable use of energy storage technologies that had previously been impractical for use in large scale electric power demand leveling applications. In some embodiments, energy storage subsystem 102 is a flowing electrolyte battery.

Controller 108 may be configured and arranged to a receive a regulation up and/or regulation down signal from an external system, such as monitoring and/or control equipment of grid 106. For example, controller 108 may be configured and arranged to a receive a regulation up and/or regulation down signal from a power meter measuring power flow in system 100. Alternately or in addition, controller 108 may internally generate a regulation up and/or regulation down signal, such as in response to command from an operator of system 100 and/or grid 106. For example, in some embodiments of system 100, controller 108 includes voice recognition capability allowing controller 108 to receive and decode spoken regulation up and/or regulation down commands. In such embodiment, controller 108 may be operable to distinguish spoken commands of authorized operators from spoken commands of other people and only respond to commands from authorized operators.

As discussed above, controller 108 causes system 100 to provide regulation up and/or regulation down services by causing energy storage subsystem 102 to be discharged into grid 106 via interface 104 at a rate that is less than a maximum discharge rate of energy storage subsystem 102. Such rate of discharge may be chosen to maximize regulation up or regulation down capability to system 100. For example, if it is desired to maximize system 100's capability to provide regulation down services, such as due to regulation down services being more lucrative than regulation up services, the rate of discharge of energy storage subsystem 102 may be set relatively high to allow for a significant decrease in discharge of energy storage subsystem 102 into grid 106. Conversely, if it is desired to maximize system 100's capability to provide regulation up services, such as due to regulation up services being more lucrative than regulation down services, the rate of discharge of energy storage subsystem 102 may be set relatively low to allow for a significant increase in discharge of energy subsystem 102 into grid 106.

Interface 104 is typically operable to convert AC power from grid 106 into DC electric power for charging energy storage subsystem 102. Interface 104 also is typically operable to convert DC electric power from energy storage subsystem 102 into AC electric power for grid 106. Interface 104 also controls charging and discharging of energy storage subsystem 102. In some embodiments, interface 104 includes both rectification and inverting subsystems, either as discrete subsystems or as a single package system.

However, interface 104 may have other configurations. For example, if grid 106 is a DC power grid, interface 104 may include one or more DC-to-DC converters, such as one or more bidirectional DC-to-DC converters. As another example, if energy storage subsystem 102 is configured to store AC power, interface 104 may have an AC interface electrically coupled with energy storage subsystem 102.

Grid 106 is, for example, one or more utility electric power grids. For example, grid 106 could represent a number of utility electric power grids, where system 100 could be configured to receive electric power for storage from one grid and provide the electric power to a different grid. Grid 106 need not be a utility electric grid, however. For example, grid 106 may represent the electric power system of a vehicle or a building that is not connected to a commercial utility electric power grid.

Controller 108 is optionally programmable to at least partially control operation of system 100 in a desired manner in response to inputs such as current economic conditions, predicted power demand variations, and/or the status of grid 106 (e.g., availability of generation capacity of grid 106). In such embodiments, controller 108 optionally includes a link to an external system or systems (not shown) in order to obtain information such as electric power pricing information, predicted electric power demand information, and/or grid 106 status information. For example, in some embodiments, controller 108 is operable to schedule charging of energy storage subsystem 102 during times of low electric power prices (e.g., when a price for purchasing electric power from grid 106 is below a first threshold value) or during times of low electric power demand. Electric power purchased at a relatively low price and stored in energy subsystem 102 may subsequently be sold to customers associated with grid 106 at a higher price in order to realize a profit. As another example, controller 108 may be operable to schedule charging of energy storage subsystem 102 such that system 100 is available to provide electric power demand leveling during times of predicted electric power demand variations or when the sale price of electric power to grid 106 is sufficiently high (e.g., above a second threshold value). As yet another example, controller may be configured and arranged to set the discharge rate of energy storage subsystem 102 in order to maximize system 100's ability to provide regulation up or regulation down services, such as in response to the need for such services or in response to the economic benefit obtained from providing such services.

Figure 2:
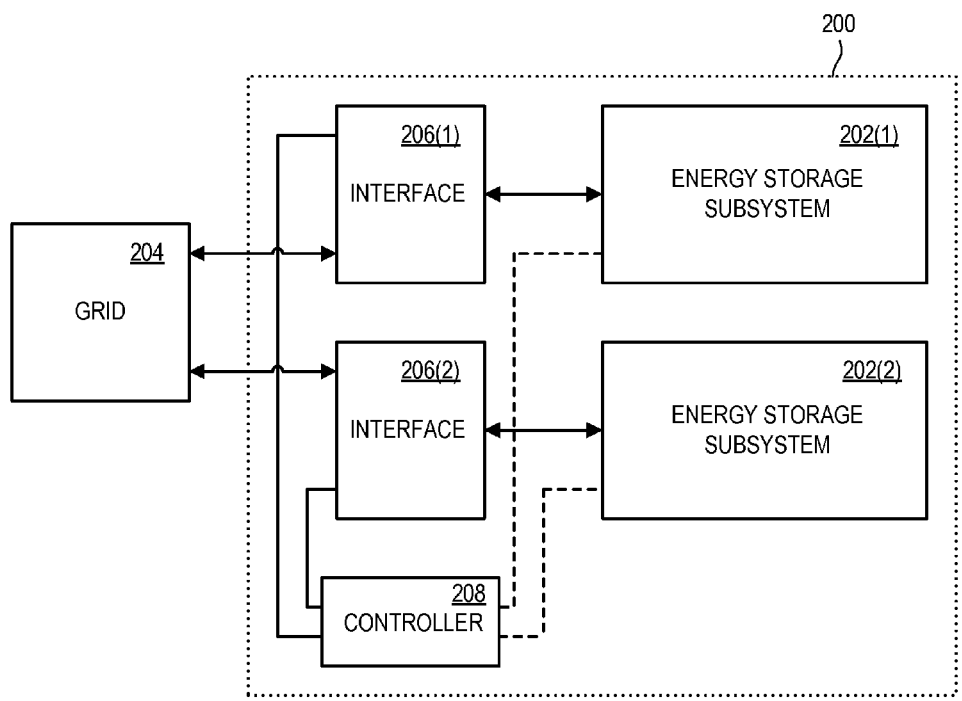
FIG. 2 shows an alternate embodiment of the system of FIG. 1.

In certain embodiment, system 100 may include a plurality of energy storage subsystems 102. For example, an energy storage system 200 shown in FIG. 2 includes two energy storage subsystems 202 electrically coupled to an electric power grid 204 via interfaces 206. Although each energy storage subsystem 202 is shown as electrically coupled to a respective interface 206, a single interface 206 could alternately be used to couple both energy storage subsystems 202 to grid 204. A controller 208 controls operation of interfaces 206 and optionally also controls energy storage subsystems 202. Controller 208 operates, for example, such that one energy storage subsystem 202 is being charged while the other energy storage subsystem 202 is being used to provide regulation up or regulation down services to grid 204. As another example, controller 208 may operate system 200 such that energy storage subsystem 202(1) is being discharged at its maximum rate into grid 204 while energy storage subsystem 202(2) is being charged into grid 204 at less than the maximum rate of discharge of energy storage subsystem 202(2).

Figure 3:
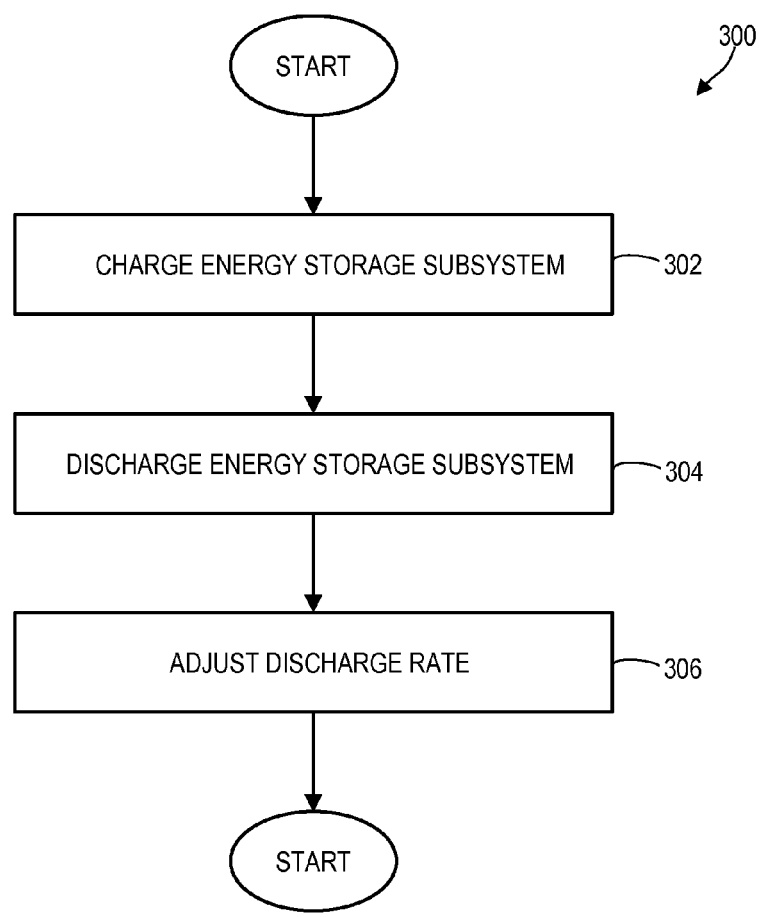
FIG. 3 shows one exemplary method for responding to a change in electric power demand, according to an embodiment.

FIG. 3 shows one exemplary method 300 for responding to a change in electric power demand. Method 300 begins with step 302 of charging an energy storage subsystem. An example of step 302 is charging energy storage subsystem 102 of system 100 from grid 106 via interface 104. In step 304, the energy storage subsystem is discharged at a rate that is less than its maximum discharge rate. An example of step 304 is discharging energy storage subsystem 102 into grid 106 via interface 104 at a rate that is less than a maximum discharge rate of energy storage subsystem 102. In step 306, the discharge rate of the energy storage subsystem is adjusted in response to a signal to provide one of a regulation up or a regulation down command. One example of step 306 is decreasing the discharge rate of energy storage subsystem 102 to provide regulation down services. Another example of step 306 is increasing the discharge rate of energy storage subsystem 102 to provide regulation up services.

Changes may be made in the above methods and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A method for responding to a change in electric power demand, comprising:
    charging a flowing electrolyte battery from an electric power grid;
    discharging the flowing electrolyte battery into the electric power grid at a discharge rate that is less than a maximum rate of discharge of the flowing electrolyte battery; and
    effectively absorbing electric power from the electric power grid by decreasing the discharge rate of the flowing electrolyte battery, in response to a signal to provide a regulation down service.

2. The method of claim 1, further comprising increasing the discharge rate in response to a signal to provide a regulation up service.

3. The method of claim 1, the step of charging comprising purchasing electric power from the electric power grid at a time when a purchase price for electric power obtained from the electric power grid is below a first threshold value.

4. The method of claim 3, the step of discharging being executed when a price for selling electric power to the electric power grid is above a second threshold value.

5. The method of claim 1, wherein the discharge rate is initially about half of the maximum rate of discharge of the flowing electrolyte battery.

6. An energy storage system, comprising
    a flowing electrolyte battery for storing electric power;
    an interface for interfacing the flowing electrolyte battery with an electric power grid; and
    a controller configured and arranged to control operation of the interface such that (a) a discharge rate of the flowing electrolyte battery is less than a maximum discharge rate of the flowing electrolyte battery, and (b) electric power is effectively absorbed from the electric power grid by decreasing the discharge rate of the flowing electrolyte battery, in response to a signal to provide regulation down service.

7. The system of claim 6, the controller comprising an interface with at least one external system to obtain information selected from the group consisting of electric power pricing information, electric power demand information, and status of the electric power grid.

8. The system of claim 6, wherein the controller is further configured and arranged such that the discharge rate of the flowing electrolyte battery is initially set at about half of the flowing electrolyte battery's maximum discharge rate.

* * * * *